United States Patent [19]
Lunn et al.

[11] 3,766,604
[45] Oct. 23, 1973

[54] HINGED SUSPENSION DEVICE

[75] Inventors: John Gilmer Lunn, Austin, Minn.; Gerald Loren Helgeson, Algona, Iowa

[73] Assignee: Geo. A. Hormel & Company, Austin, Minn.

[22] Filed: Dec. 26, 1972

[21] Appl. No.: 318,566

[52] U.S. Cl. ............................................. 17/44.2
[51] Int. Cl. .......................................... A22c 15/00
[58] Field of Search .................... 17/44, 44.2, 44.4

[56] References Cited
UNITED STATES PATENTS
3,609,797   10/1971   Zwiep et al. ........................ 17/44.2

Primary Examiner—Robert Peshock
Attorney—George F. Williamson et al.

[57] ABSTRACT

A hinged suspension device is attached to embedded bones in a chunk of meat and provides a means for suspending the chunk of meat from a conveyor and from coupling means in a deboner unit. The suspension device includes a cylindrical body having a slotted head at one end and an end flange at the other end. An intermediate flange on the body cooperates with the end flange and head to define a pair of recessed areas which are engaged by conveyors and coupling means on the deboning units during the various steps of the deboning operation. An elongate threaded pin is hinged to the body by interconnected eyelets to permit limited swinging movement of the pin in substantially any direction through an arc of approximately 20°. The pin is of a length to extend through and immobilize the articulated joint between the embedded bones. The universal type joint utilized in this suspension device permits unsymmetrical large chunks of meat to swing freely during the deboning operation and also allows the cylindrical body of the device to remain substantially plumb during all of the handling steps associated with the deboning operation.

7 Claims, 5 Drawing Figures

PATENTED OCT 23 1973

3,766,604

HINGED SUSPENSION DEVICE

SUMMARY OF THE INVENTION

In applicant's meat deboning system, as disclosed in U.S. Pat. 3,533,128, a pin device is applied to the embedded bones of the chunk of meat, and this pin device serves to immobilize the articulated joint between the embedded bones. The pin device also provides a means of suspending or otherwise handling the chunk of meat as it is moved through the various deboning steps, and also for handling the extracted bone after completion of the meat deboning operation.

One of the problems experienced in the aforementioned deboning patent was the problem of holding or maintaining the extracted bone in a precise position so that it could be removed from the spindle mechanism. In this respect, that portion of the spindle mechanism which gripped the pin device was provided with a flexible joint. After the bone had been extracted, the pin device and attached extracted bone were removed from the spindle mechanism, the removal of the pin device and attached bone from the spindle mechanism was difficult.

It is therefore a general object of this invention to provide a hinge suspension device including a pin pivotally connected to the body of the device and adapted to extend into and immobilize the embedded bones in a chunk of meat. The hinge connection between the pin and the body of the suspension device permits limited substantial universal swinging movement of the pin relative to the body of the device through a relatively small arc. Since the spindle mechanism is of relatively rigid construction and since that portion of the pin device which is gripped by the spindle mechanism is also rigid, the pin device and attached bone may now be easily removed. Further, through the use of a hinge connection, the body of the suspension device may be suspended in a plumb condition from conveyors and similar handling structures, even though the chunk of meat is of unsymmetrical configuration.

Finally, the hinge suspension device is also arranged and constructed to permit the device to be gripped or engaged by the various conveyors and supporting arms during the deboning process.

These and other objects and advantages of this invention will more fully appear from the following description made in connection with the accompanying drawings wherein like reference characters refer to the same or similar parts throughout the several views.

DETAILED DESCRIPTION

Figure 1:
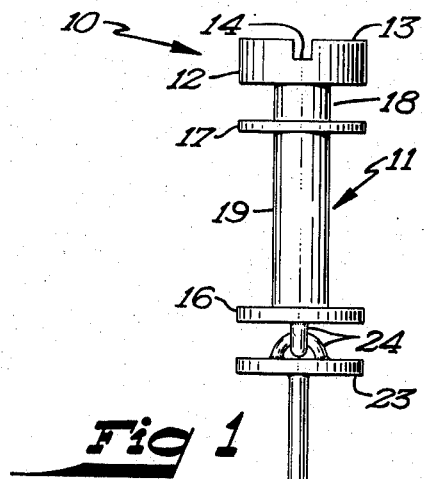
FIG. 1 is an elevational view of the novel hinged suspension device.
Figure 3:
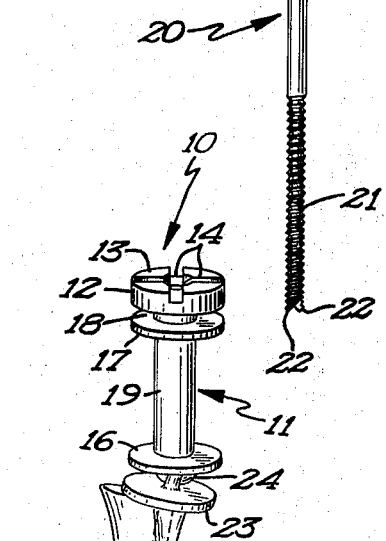
FIG. 3 is a perspective view of the suspension device attached to an extracted bone after the deboning operation.

Referring now to the drawings and more specifically to FIG. 1, it will be seen that one embodiment of the hinge suspension device, designated generally by the reference numeral 10, is there shown. This novel suspension device 10 includes an elongate cylindrical body 11 formed of a suitable metallic material and having an enlarged cylindrical head 12 at one end thereof. The cylindrical head 12 has a substantially flat upper face 13 which is provided with a pair of diametrical slots 14 therein arranged in substantially right angular relationship with respect to each other. The cylindrical head 12 also has an upwardly opening central aperture 15 therein.

The body 11 of the suspension device also has an end flange 16 integrally formed with the other end thereof and extending radially outwardly therefrom. An intermediate flange 17 is integrally formed with the body 11 and is spaced from the head 12 and the end flange 16. The intermediate flange 17 is of circular configuration and its radius is substantially identical to the radii of the cylindrical head 12 and the end flange 16 so that these flanges and head are of substantially the same size.

The intermediate flange 17 cooperates with the head 12 to define a first annular recessed area 18 therebetween, and cooperates with the end flange 16 to define a second annular recessed area 19 therebetween. It will be noted that the intermediate flange 17 is positioned closer to the head 12 than the end flange 16 whereby the annular recessed area 19 has a greater axial or length dimension than the length dimension of the annular recessed area 18.

The recessed annular area 18 is adapted to be engaged by the suspension mechanisms on the conveyors when the chunks of meat are conveyed to the deboning units, and by the suspension mechanisms on the conveyors which convey the extracted bones from the units. Such structure is shown in U.S. Pat. 3,581,337. The annular recessed area 19 is adapted to be engaged by the transfer arms which transfer the chunk of meat from the conveyor to the deboning unit, and which transfer the suspension device from the deboning unit with the extracted bone attached thereto, to the conveyors. Thus the relative size and configuration of the recessed areas is important in permitting these functions to be carried out by the various components of the deboning apparatus.

The suspension device also includes an elongate substantially straight pin 20 which, as shown, is threaded from adjacent approximately its mid-portion to the lower or outer end thereof. It will be noted that the threaded pin terminates in a pair of beveled points 22 which facilitate threading of the pin into the bones to be immobilized. The upper end of the pin 20 has an end flange or collar 23 integral therewith and extending radially outwardly therefrom. The collar 23 has a radius substantially identical to the radius of the end flange 16 and is therefore of substantially the same size as the end flange 16. Hinge means are provided for hingedly connecting the pin 20 to the body 11, and this hinge means includes a pair of U-shaped elements or eyelets 24, one of which is affixed to the end flange 16 and the other being fixedly connected to the collar 23. The U-shaped hinge elements 24 are looped through each other thereby permitting relative swinging movement between the body 11 and the pin 20.

In this respect, it is pointed out that the body 11 will normally be held by some component of the deboning apparatus thereby permitting the pin 21 to swing relative thereto. In the embodiment shown, the pin 21 may swing in substantially any direction from the axial center of the body 19 through an arc of approximately 20°. Further swinging movement of the pin 20 is limited by the interengagement of the end flange 16 and the collar 23. The collar 23 also serves to limit or prevent further rotation of the pin 20 relative to the bone during the deboning operation. In this respect, since the spindle mechanism rotates during the deboning operation, there is a tendency for the pin device to rotate relative to the attached bone. The collar 23 therefore prevents further penetration (by rotation) of the pin into the bone. It is desirable to limit the swinging movement of the pin 20 relative to the body 11 and while the pin may swing approximately 20° from vertical in any direction in the embodiment shown, the hinge may be constructed to permit the pin to swing through an arc of approximately 30° in any direction from the axis of the body 11. Thus in effect the hinge connection defined by the hinge elements 34 is in effect a universal coupling.

If the collar 23 were eliminated, the pin then could swing through an arc of 180°. Although the hinge suspension device 10 could still function, the functional advantages of the limited swinging movement between the body and the pin would not be available.

In use, each suspension device 10 will be threaded into the embodded bones of a chunk of meat by a bone pinning machine such as that shown in U.S. Pat. 3,533,129. In the embodiment shown, the suspension device has been applied to a pork shoulder or picnic which has an articulated joint between the embedded bones. The pin 20 will be threaded through the articulated joint to immobilize the joint and to thereby permit effective extraction of the bone by the deboning apparatus. One of the important features of the pin device is the beveled pointed ends 22 of the pin 20. The beveled pointed ends not only facilitate the threaded action of the pin 20 through the bone but also assist in maintaining the pin 20 in a substantially straight trajectory as the pin is threaded into the bone. Further, the beveled points are also self cleaning as the pin is threaded into the bone. Not only are the beveled points easily cleaned, but these beveled points exert little if any outward radial force during the threaded operation. Therefore the bones are subjected to little if any, splitting action which is in sharp contact to pins with conical points. The slots 14 and the central aperture 15 in the cylindrical head of the body 11 will be engaged by the screwdriver elements of the bone pinning machine to permit threading of the pin to the bone. The aperture 15 actually constitutes a centering aperture to permit proper alignment of the screwdriver elements in the slots. In this respect, it is pointed out that the bone pinning apparatus disclosed in U.S. Pat. 3,533,129 has been modified to accommodate the hinged feature of the suspension device 10.

Figure 2:
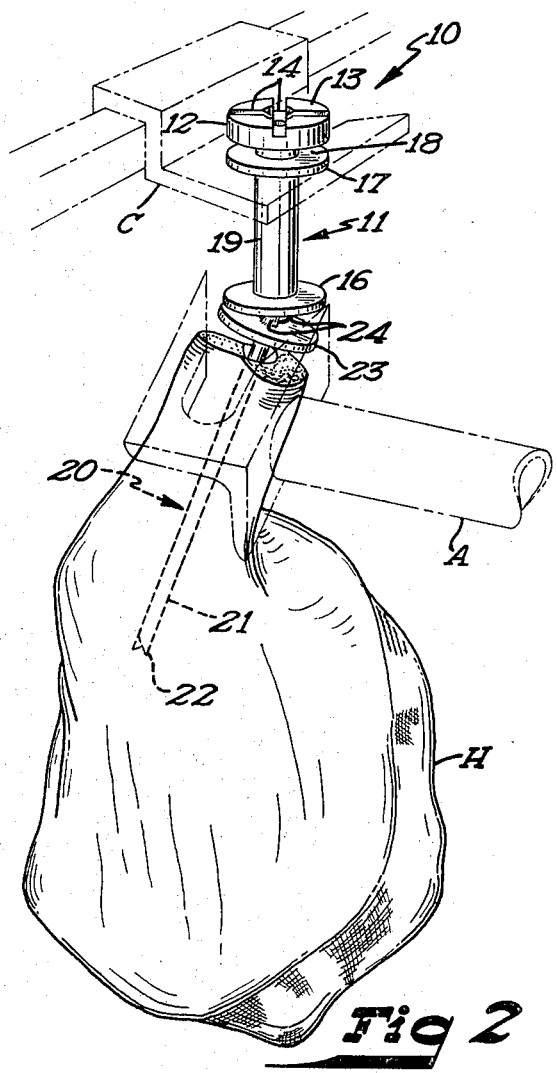
FIG. 2 is a perspective view of the device illustrating the manner in which it is applied to a chunk of meat and also illustrating in the dotted line configuration, the various components of the deboning system which interact with the suspension device.
Figure 4:
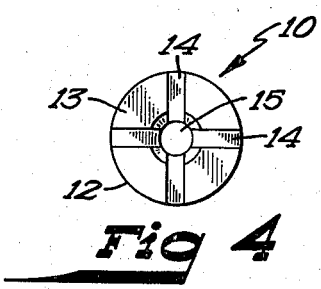
FIG. 4 is an end view of the upper end of the suspension device.
Figure 5:
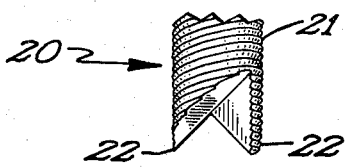
FIG. 5 is a fragmentary elevational view illustrating the end portion of the pin.

After the pin has been applied to the embedded bones, the suspension device will be engaged by the suspension devices on a conveyor C as shown in dotted line configuration of FIG. 2. In this respect, the suspension devices on the conveyor will engage in the recessed area 18 to very securely but releasably suspend the suspension device 10 from the conveyor. Because of the unique hinge, the chunk of meat may swing freely to always permit the body 11 to be maintained in a plumb condition. As pointed out above, the arc of swinging movement from the longitudinal axis of the body is approximately 20° in any direction since it has been found that this degree of swinging movement is all that is needed, especially with respect to the pork shoulders.

When the chunk of meant such as the picnic H is conveyed to the deboning unit, the arm A of the deboning unit, will engage the suspension device at the annular recessed area 19. The arm A illustrated in FIG. 2 in dotted line configuration is of the type disclosed in U.S. Pat. 3,533,128. The body of the suspension device will be engaged by the spindle mechanism of the deboning unit, and again it is pointed out that the unsymmetrical chunk of meat may swing freely as the chunk of meat is revolved by the spindle mechanism during the bone removal process.

After the bone has been extracted, the annular recess area 19 will be engaged by the removal arm of the deboning unit and will be transferred from the deboning unit into a position so that the annular recess area 18 may be engaged by a suspension mechanism of the conveyor C. The suspension device and attached bone will be conveyed to an apparatus for removing the suspension device from the bone. This type of apparatus is disclosed in U.S. Pat. 3,581,337 and after the suspension device has been removed, it will be returned to the bone pinning apparatus.

From the foregoing, it will be seen that the novel hinged suspension device 10 facilitates handling of the chunks of meat to be deboned and handling of the extracted bones after the deboning operation. Through the use of the unique hinged suspension device, the problems of removing the pin device and attached extracted bone from the spindle mechanism is more easily accomplished.

Thus it will be seen that I have provided a novel hinged suspension device, which is not only of simple and inexpensive construction, but one which functions in a more efficient manner than any heretofore known comparable device.

What is claimed is:

1. A hinged suspension device for use in suspending a chunk of meat to be deboned from a supporting structure, comprising
   an elongate cylindrical body,
   an enlarged cylindrical head integral with one end of said body and projecting radially outwardly therefrom, said head including a substantially flat outer radial face having a pair of diametrically extending, intersecting slots therein,
   an enlarged radial end flange integral with the other end of said body and extending radially outwardly therefrom,
   an intermediate radial flange integral with said body and extending radially outwardly therefrom, and being located between, and spaced from said head and end flange respectively,
   a first annular recessed area defined between said head and said intermediate flange and adapted to be engaged by a gripping mechanism or conveyors which convey the meat to a deboning unit, and which convey the suspension device and extracted bone from the deboner unit, a second annular recessed area defined between said end flange and said intermediate flange and adapted to be engaged by a transverse arm of a deboning unit for transferring the suspension device between the deboning unit and a conveyor, an elongate threaded pin adapted to be threaded through the articulated joint of embedded bones in a chunk of meat to immobilize the joint, and a universal hinge coupling on one end of said pin and on said body permitting limited swinging movement of the pin in substantially any direction with respect to the longitudinal axis of the body.

2. The device as defined in claim 1 wherein the length dimension of said second annular area of said body is substantially greater than the length dimension of said first annular area.

3. The device as defined in claim 1 and a substantially circular collar affixed to said pin and positioned adjacent said end flange and cooperating with the latter to limiting swinging movement of said pin and limiting further penetration of the pin into the bone.

4. The device as defined in claim 3 wherein said end flange and said collar are of substantially the same size.

5. The device as defined in claim 3 wherein said coupling between said pin and said body comprises a pair of U-shaped elements, one being affixed to said collar, and the other extending through said one U-shaped element and affixed to said end flange.

6. The device as defined in claim 1 wherein said pin is adapted to swing through an arc of approximately 20° only in any direction from the longitudinal axis of the body.

7. The device as defined in claim 1 wherein said pin is provided with pairs of beveled points at one end thereof.

* * * * *